(12) United States Patent
Moore

(10) Patent No.: US 8,843,941 B2
(45) Date of Patent: Sep. 23, 2014

(54) ADAPTABLE APPLICATION PROGRAMMING INTERFACES AND SPECIFICATION OF SAME

(75) Inventor: Jonathan Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/590,068

(22) Filed: Aug. 20, 2012

(65) Prior Publication Data
US 2014/0053166 A1 Feb. 20, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC . *G06F 9/54* (2013.01); *G06F 9/465* (2013.01)
USPC ........................................... 719/316

(58) Field of Classification Search
None
See application file for complete search history.

(56) References Cited

U.S. PATENT DOCUMENTS

| 7,272,787 B2 * | 9/2007 | Nakamura et al. ............ 715/234 |
| 2008/0141139 A1 * | 6/2008 | Murren et al. ................ 715/744 |
| 2009/0198702 A1 * | 8/2009 | Novik et al. .................... 707/10 |
| 2012/0017078 A1 * | 1/2012 | Reno et al. .................... 713/153 |

OTHER PUBLICATIONS

Lanthaler and Gutl, "On Using JSON-LD to Create Evolvable RESTful Services," Apr. 2012, ACM, 3rd International Workshop on RESTful Design (WS-REST 2012) , pp. 25-32, retrieved from "http://dl.acm.org/citation.cfm?id=2307827" on Jul. 23, 2013.*
Benjamin Carlyle, "Sound advice—blog, Best Practices for HTTP API evolvability," Dec. 6, 2011, retrieved from http://soundadvice.id.au/blog/2011/12/06/ on Jan. 28, 2014. 9 pages.*

* cited by examiner

*Primary Examiner* — H S Sough
*Assistant Examiner* — William C Wood
(74) *Attorney, Agent, or Firm* — Ballard Spahr LLP

(57) ABSTRACT

Aspects of the disclosure relate to defining and/or specifying an application programming interface (API) between a client and a computing device (such as a server) in a manner that the client, the computing device, or both, can evolve independently while preserving inter-operability.

20 Claims, 14 Drawing Sheets

```
<html>
<body>
<ul class="wishlist">
<li class="wishitem"><a rel="self" href="..."></a></li>
<li class="wishitem"><a rel="self" href="..."></a></li>
</ul>
<form class="additem" method="POST" action="...">
<input type="text" name="itemname"/>
<input type="submit" value="Add item to wishlist"/>
</form>
</body>
</html>
```

FIG. 3

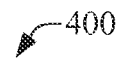

```
<html>
<body>
<ul class="wishlist">
<li class="wishitem"><span class="itemname">Raindrops on roses</span></li>
<li class="wishitem"><span class="itemname">Whiskers on kittens</span></li>
</ul>
<form class="additem" method="POST" action="...">
<input type="text" name="itemname"/>
<input type="submit" value="Add item to wishlist"/>
</form>
</body>
</html>
```

FIG. 4

```
<html>
<body>
<ul class="wishlist">
<li class="wishitem"><span class="itemname">Raindrops on roses</span>
<form class="delete_item" method="POST" action="...">
        ...
</form>
</li>
<li class="wishitem"><span class="itemname">Whiskers on kittens</span>
<form class="delete_item" method="POST" action="...">
        ...
</form>
</li>
</ul>
    ...
</body>
</html>
```

FIG. 5

```
<html>
<body>
<form class="delete_item" method="POST" action="...">
<input name="self" type="text"/>
</form>
<ul class="wishlist">
<li class="wishitem" id="...">...</li>
<li class="wishitem" id="...">...</li>
</ul>
   ...
</body>
</html>
```

```
<div class="car">
<span class="make">Chevrolet</span>
<span class="model">Corvette</span>
</div>
```

```
<div class="car">
<a_rel="self" href="..."/>
<span class="make">Chevrolet</span>
<!-- model attribute elided for brevity -->
</div>
```

```
<div class="car">
<div class="owner"><!-- 'owner' field of the car -->
<span class="firstname">Jon</span>
</div>
</div>
```

FIG. 10

```
<div class="car">
<a rel="owner" href="..."/><!-- 'pointer' to owner -->
</div>
```

FIG. 11

```
<div class="car">
<form class="accelerateTo" method="..." href="...">
<input name="mph" type="text"/>
<input type="submit" value="acclerateTo"/>
<!-- submit button included for humans using browsers! -->
</form>
</div>
```

FIG. 12

```
<div class="car" id="abcd1234">
</div>
...
<form class="accelerateTo" method="..." href="...">
<input name="self" type="text"/>
    <input name="mph" type="text"/>
    <input type="submit" value="accelerateTo"/>
</form>
```

FIG. 13

```
<div class="car">
<a rel="accelerateTo" href="...">accelerateTo</a>
</div>
```

FIG. 14

```
class HypermediaClient:
    def init(self, entry_point):
    def getStaticField(self, fieldName):
    def invokeStaticMethod(self, methodName, args):
    def getMemberField(self, object, fieldname):
    def invokeMethod(self, object, methodName, args):
```

FIG. 15

ADAPTABLE APPLICATION PROGRAMMING INTERFACES AND SPECIFICATION OF SAME

BACKGROUND

Server-client interoperation generally depends on suitable implementation of both. Evolving a server to change nontrivial aspects of its implementation without "breaking"— invalidating the assumptions of—pre-existing clients can be challenging. Some straightforward server-side updates are possible, especially when they are additive (e.g., add more data to pre-existing message transfers, add additional optional message transfer, etc.). In addition, certain specifications, such as application-level profile semantics (ALPS), have been put forward to address how to adequately specify a hypermedia application programming interface. While modern forms of application programming interfaces (APIs), such as hypermedia APIs and APIs based on the representational state transfer (REST) architectural style, can be utilized for inter-operability in client-server configurations, implementation in production deployments has been largely marginal.

SUMMARY

The disclosure relates, in one aspect, to defining and/or specifying an application programming interface between a client device (or client) and a computing device (such as a server) in such a manner that the client, the computing device, or both, can evolve independently while preserving interoperability. In the disclosure, such an API is referred to an adaptable API. In one aspect, the disclosure provides a group of conventions for taking a semantic domain object model, for example, as diagrammed in unified modeling language (UML), and then representing such model as an extensible hypertext markup language (XHTML)-based RESTful API that can be specified in a manner such that a correctly implemented client (e.g., a correctly compiled client) can interoperate with a correctly implemented computing device (e.g., a correctly compiled server). In one aspect, the computing device can retain the ability to control the server's URI space—including, for example, query parameter construction, naming, and passing—and the relative refinement (e.g., coarseness or granularity) of the resource representations being returned. Such feature can provide for both "deep" and "shallow" representations without causing a client to "get lost."

In one aspect, by adopting one or more of the conventions that permit mapping an application domain object model onto a set of XHTML representations, a hypermedia client can operate on the domain object model without failing to access data structures and/or related method(s). Such a hypermedia client is referred to as a client that can operate with getting "lost." The disclosure can retain substantive freedom for a computing device (e.g., a server) regarding how deep or shallow the computing device's resource representations and client application states may be. In certain implementations, an automated test can be provided to check that object representations satisfy one or more of the required criteria, and that static fields and methods can be discoverable from the entry point(s) (e.g., a base memory address, or a reference thereto, in a memory page). Integrity of the object representations can provide a substantive degree of non-breaking (referred to as "safe") evolution with respect to transmitting-device—receiving-device inter-operability.

Some embodiments of the disclosure provide various advantages when compared to conventional technologies for evolving a computing device (e.g., a server) to update nontrivial aspects of the computer device implementation without breaking pre-existing clients. For example, some embodiments permit evolution of a computing device (e.g., a server) beyond updates in implementation (e.g., functionality) that extend beyond additive updates, e.g., addition of data to pre-existing message transfers, addition of optional message transfers, and the like. For another example, some embodiments mitigate or avoid versioning of an API with the ensuing simultaneous running of multiple server versions and/or requiring a coordinated upgrade across several clients. For yet another example, some embodiments permit upgrading computing device (e.g., a server) implementations without breaking clients that need not be upgradeable on demand and/or are deployed in "the wild" in that the deployment environments are not managed by an administrator of the computing devices that are upgraded.

Additional aspects or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

FIGS. 3-6 illustrate example hypermedia APIs in accordance with one or more aspects of the disclosure.

FIGS. 8-14 illustrate example hypermedia APIs in accordance with one or more aspects of the disclosure.

FIG. 15 illustrates an example object in accordance with one or more aspects of the disclosure.

DETAILED DESCRIPTION

Figure 1:
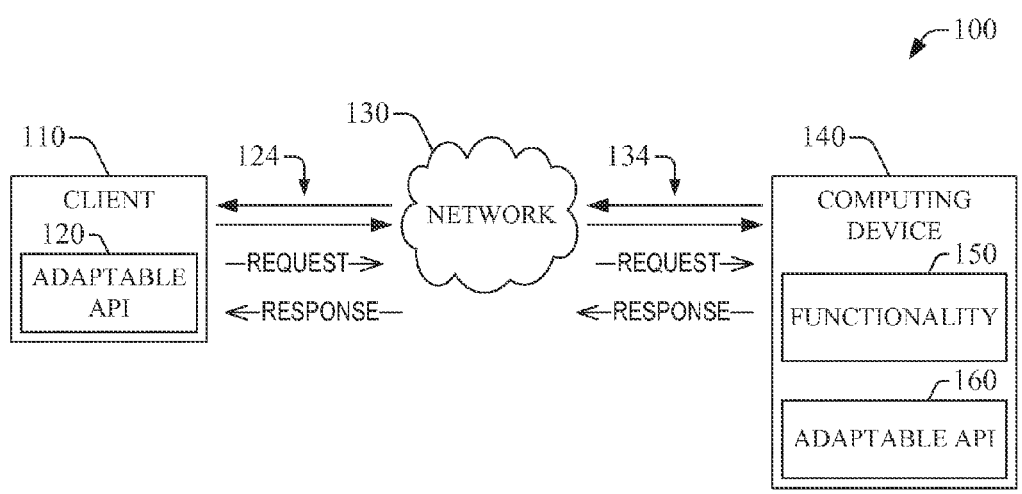
FIG. 1 illustrates an example transmitting-device-receiving-device (e.g., client-server) environment in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for defining and/or specifying an API between a client and a server in such a manner that the client or the server, or both, can evolve independently while preserving inter-operability. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "client," "server," and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "layer," "unit," "component," "interface," "platform" "node," "function," "client," and "server" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the issue of evolving a server to change non-trivial aspects of its implementation without "breaking"—invalidating the assumptions of—pre-existing clients. In one scenario, as the Web ecosystem has grown and flourished, many businesses have had success exposing their functionality via application programming interfaces (APIs)—Twitter, Facebook, and Netflix being well-known examples. In turn, third-party developers and partners are able to enrich the base experience by providing "mash-up" applications, mobile client apps, clients embedded in consumer electronics, and more. This necessarily creates some coupling between client and server implementations, and major challenges arise when the API server operators decide they want or need to upgrade their API, particularly in a non-backwards-compatible way. Such upgrades to an API often can lead to either expensive deployments (maintaining multiple historical versions of the API) or to broken clients who find their assumptions invalidated by an updated API. Neither choice is particularly desirable.

As described in greater detail below, in one aspect, the disclosure relates to defining and/or specifying an application programming interface (API) between a client and a computing device, which can embody a server, in such a manner that the client, the computing device, or both, can evolve independently while preserving interoperability. The disclosed hypermedia APIs can provide a framework for generation (e.g., composition, specification, etc.) of an interface that can permit significant computing-device-side variation (e.g., server upgrades) without breaking correctly-implemented clients. In one aspect, the disclosure provides a set of general conventions that describe how to map an application domain object model onto an XHTML-based hypermedia API. Such conventions can leverage, in one aspect, implementation of calling conventions and object layout conventions utilized by compilers for object-oriented languages. The disclosed framework can address, in one aspect, the all-too-common issue of how to upgrade an API provisioned (e.g., configured and utilized) in an computing environment that is not controlled by an administrator of a server that can rely on the API for inter-operation (e.g., functional coupling) with a client. Such API can be referred to as an interface "in the wild." In certain scenarios, the disclosed framework can reduce implementation complexity of API upgrades associated with various web-based APIs, especially, yet not exclusively, in social networking applications.

Application programming interfaces based on the REST architectural style—referred to as "RESTful" APIs—are APIs that apply substantially the same fundamental architectural constraints supporting the World Wide Web. This is commonly understood in practice to mean utilizing hypertext transfer protocol (HTTP) as an application protocol, e.g., using HTTP GETs for reads, PUTs for writes, and so forth. Despite many scalability advantages associated with RESTful APIs, such APIs that also are hypermedia APIs are rare. Various features of the disclosure can improve REST implementations for composition (e.g., definition and/or specification) of APIs, and can be useful for constructing scalable and performant web APIs. In one aspect, the disclosed framework for composition of an API contemplates evolution, in that an API composed (e.g., defined and/or specified) in accordance with one or more aspects of the disclosure can maximize, for example, the number of functional features that a server can modify without breaking clients and/or having to deploy and operate multiple API versions.

In the disclosure, in one aspect, computing devices, such as servers, in a client-server deployment, for example, can present controls inline with data, leading clients to "surf" the API by following links and submitting forms, in a manner similar to what humans do when browsing a web site. A client-server deployment is an example embodiment of a functional communication deployment between two functional elements (or points), such as two devices, e.g., a transmitting device and a receiving device, a provider device and an end-user device, and the like. It should be appreciated that one or more of the client 110 or the computing device 140 can be mobile (e.g., wireless) or otherwise (e.g., pseudostationary or tethered). Such "surfing" can permit a server to vary (to a considerable extent, for example) the "terrain" of an API as long as the server can continue to provide recognizable "signposts" for the server's client(s). FIG. 1 is a high-level block diagram of an example network environment 100 comprising a transmitting-device-receiving-device (client-computing-device) deployment in accordance with one or more aspects of the subject disclosure. As illustrated, a client device 110 (or client 110) can comprise an adaptable hypermedia API 120 (also referred to as adaptable API 120 or evolvable API 120) and is functionally coupled to a computing device 140 (e.g., a server) via a network 130. In one implementation, the network 130 can be administered (e.g., owned, operated, and/or leased) by a network operator that provides services such as digital television content; internet protocol (IP) video content; digital telephony; data services, such as wide-area network services (e.g., internet service) or home network services (e.g., Wi-Fi access, femtocell access), and the like. The client 110 can be functionally coupled to the network 130 via a data and signaling pipe 124, which can comprise a upstream link (or uplink) and a downstream link (or downlink). Similarly, the computing device 140 is functionally coupled to the network 130 via a data and signaling pipe 134, which can comprise a upstream link (or uplink) and a downstream link (or downlink). Each of the data and signaling pipe 124 and the data and signaling pipe 134 can comprise one or more of wireless link(s), wired link(s) (e.g., optic fiber, coaxial cables, T3 lines, or the like), reference links (and associated network nodes, such as routers and/or gateways, etc.) or combinations thereof.

While illustrated as external to the network 130, it is contemplated that the computing device 140 (e.g., a server) can be part of such network. The computing device 140 can comprise a functionality platform 150 (referred to as functionality 150) that permits the computing device 140 to provide specific functions (e.g., manage web-based content, such as blogs, micro-blogs; operate media publishing platforms; operate web-based services; etc.). As illustrated, the computing device 140 also includes an adaptable hypermedia API 160 (also referred to as adaptable API 160) that permits access to one or more of the specific functions afforded by the functionality 150. As described herein, in order for the client 110 to "surf" (or navigate) the adaptable API 160 and thus access the functionality 150, the client 110 can communicate a request, e.g., a form submission, to the computing device 140 via the network 130. In response to the request, the computing device 140 can communicate a response (e.g., an object, a link to a method, etc.) to the client 110, which can utilize the response to access information (e.g., data or metadata) or to further navigate the adaptable API 160. It should be appreciated that the client 110 can access at least a portion of the functionality 150 in response to executing the adaptable API 120, which can be embodied in a set of one or more instructions persisted in memory (not depicted in FIG. 1).

Figure 2A:
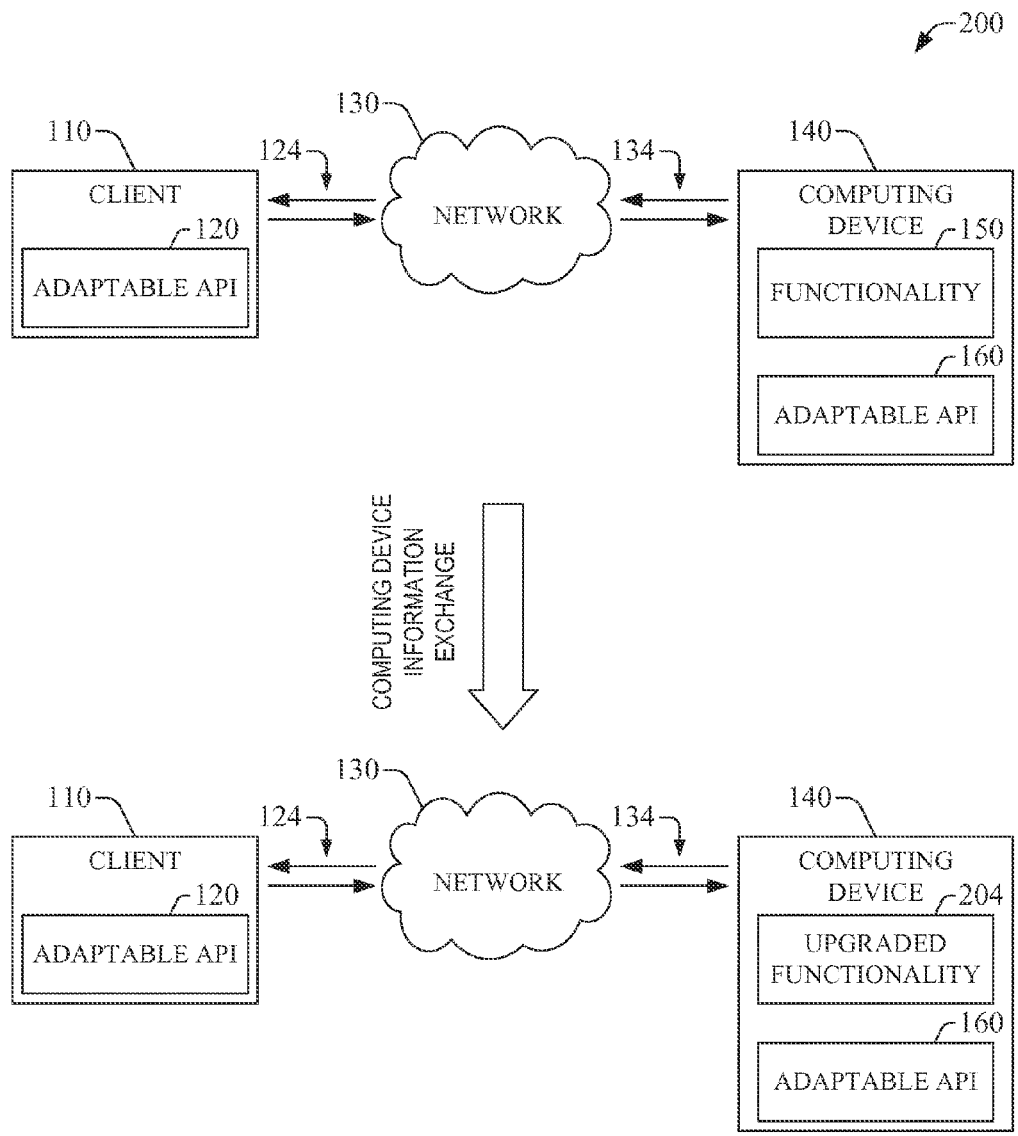
FIGS. 2A-2C illustrate example transmitting-device-receiving-device information exchanges (e.g., upgrades) in accordance with one or more aspects of the disclosure.
Figure 2B:
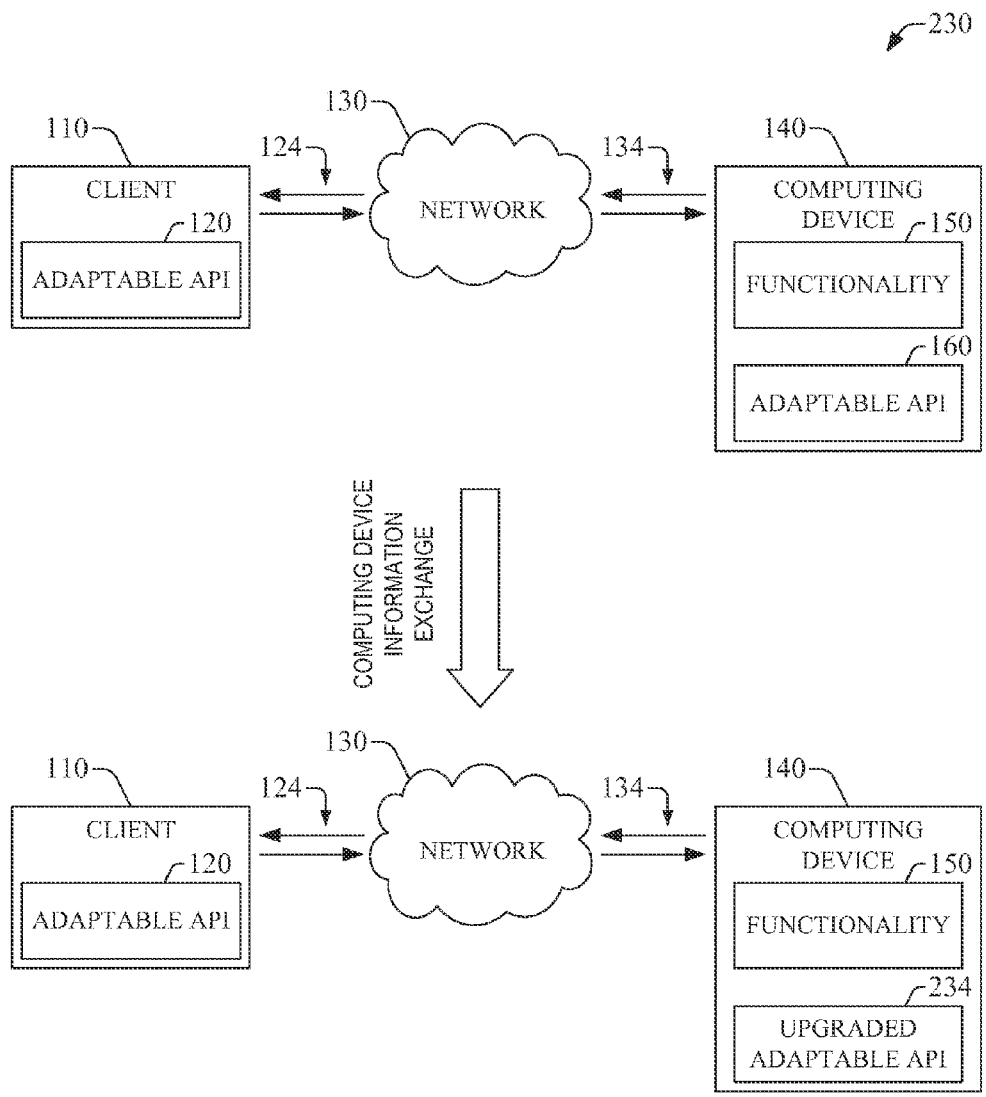
Figure 2C:
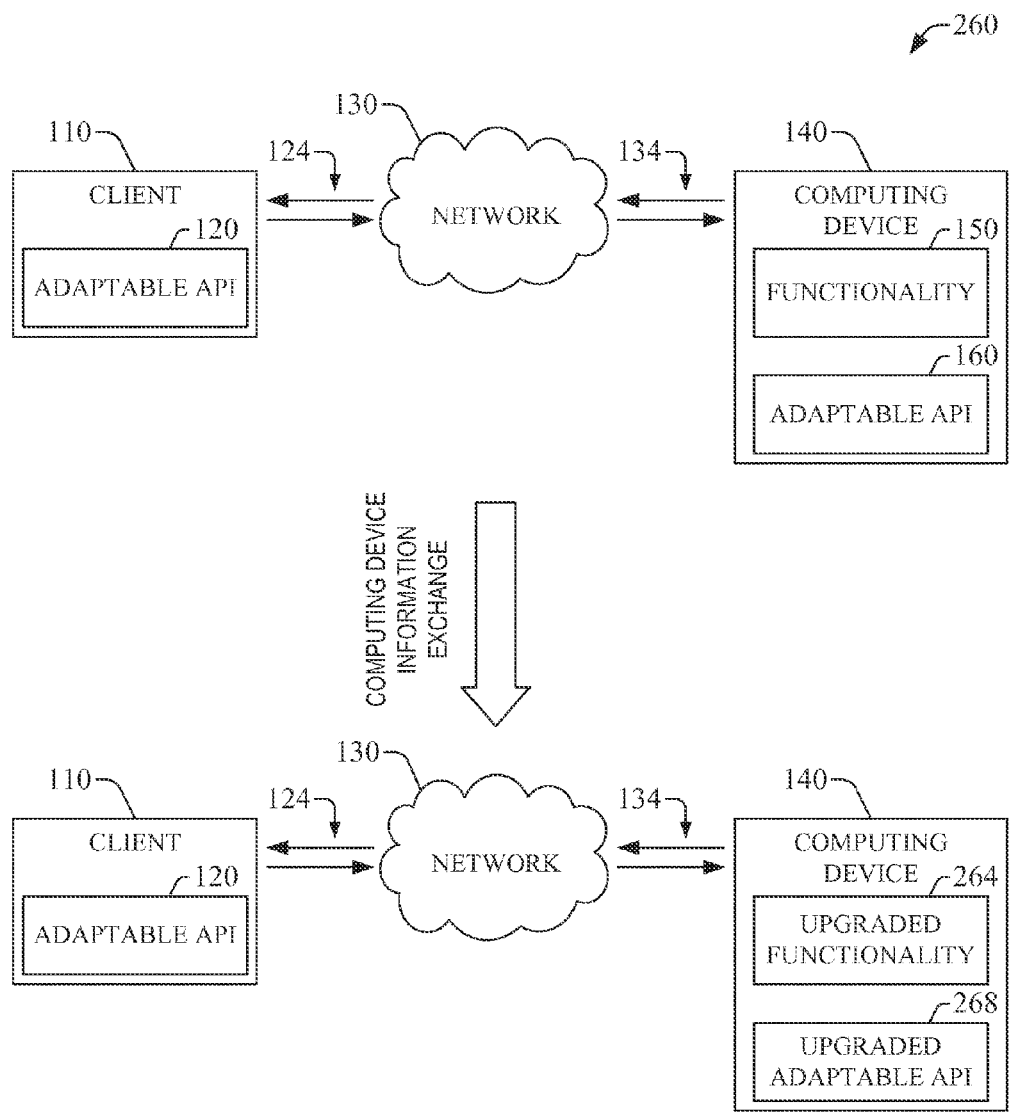

In one aspect, as described herein, the disclosure can permit clients (e.g., client 110) to continue accessing supported functionality (e.g., a function associated with functionality 150) despite changes (including substantial changes) to access mechanisms for such functionality. As illustrated in FIGS. 2A-2C, the disclosure can permit a wide variety of computing-device-side changes (e.g., server-side changes) without breaking clients and without versioning an API. Such changes can comprise information exchanges, such as data exchanges, between an initial deployment (e.g., a provisioned and accepted version of a server) and an upgraded deployment (e.g., an upgraded version of a provisioned and accepted server). As one example of server-side change, illustrated in block diagram 200, a server upgrade can include upgrading the functionality of the computing device 140 from the functionality platform 150 to an upgraded functionality platform 204, while preserving the adaptable API 160 during the upgrade. As another example of server-side change, illustrated in block diagram 230, a server upgrade can include upgrading the interface of the computing device 140 from the adaptable API 160 to an upgraded adaptable API 234, while preserving the functionality 150 during the upgrade. As yet another example, illustrated in block diagram 260, a server upgrade can include upgrading the functionality and interface of the computing device 140 from the functionality 150 and adaptable API 160 to an upgraded functionality 264 and upgraded adaptable API 268. It should be appreciated that client 110, which can be deployed in the wild, remains unchanged during the server upgrades illustrated in diagrams 200-260.

The disclosed adaptable APIs (e.g., evolvable APIs) can retain, in one aspect, substantive flexibility with respect to functionality variation for a server while ensuring that compliant client devices (or clients) can preserve inter-operability in response to server modifications. It should be appreciated that certain functional elements of the subject disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, wired or wireless equipment, etc.

In one aspect, a first stage in building a hypermedia API for a wide area network environment, such as the web, is to select a hypermedia-aware media type, such as XHTML, Atom, or HAL (Hypertext Application Language), among others. It should be appreciated that, in one aspect, plain-old extensible markup language (XML) and JSON (JavaScript Object Notation), while popular media types for web APIs, do not have standardized representations for links and forms. Thus, utilizing such types can comprise defining conventions that can be utilized to represent these types.

It should be appreciated that, in one aspect, XHTML can be utilized for generation of an evolvable API in accordance with one or more aspects of the disclosure, as XHTML is a subset of XML and thus implementers (e.g., a human agent or a machine) can exploit pre-existing XML libraries and toolsets such as parsers, extensible stylesheet language transformations (XSLT), and XPath searches. In addition, the <a>, <link>, and <form> elements of XHTML already have well-defined semantics for constructing the HTTP requests utilized to activate such elements, thus reducing the number of elements or features an API is to define.

When defining a hypermedia API, in one aspect, the API documentation can specify: (i) one or more entry point uniform resource locators (URLs) that clients can utilize to begin API interactions; (ii) one or more manners to recognize data corresponding to the application domain; and (iii) one or more manners to recognize and select possible next-step actions.

As an illustration, an API for managing a wish list of items can be considered. Some entry point URL that a client can "bookmark" and recall is assumed to be available. In one aspect, the representation available at that "homepage" URL is illustrated in FIG. 3. In the illustrated code sample and in other code samples disclosed herein, URLs are elided and, instead, a URL is represented with an ellipsis (" . . . ") in the @href attributes of <a> tags and in the @action attributes of <form> tags. Such representation of an URL is adopted for the sake of brevity and to convey that the URL is provided at runtime by a server and not known a priori by a client.

In this representation, a number of "signposts" left for a programmatic client are readily appreciated: the top-level <ul> element has a @class attribute value of "wishlist," which is utilized to identify the list construct itself. Similarly, each <li> similarly has a "wishitem" @class. These class attribute values are markers that can be utilized to identify application domain concepts in the returned data, and can be documented as such in suitable API documentation.

In the foregoing representation, two examples of hypermedia are readily appreciated: (1) each <li> contains an <a> tag with a @rel attribute of "self", which can be taken to be a link to a representation (e.g., a data structure) of that particular list item. Similarly, at the top level, a <form> with a @class of "additem" is included, such form provides a mechanism (e.g., HTTP POST) for adding a new item to the wishlist. Specific values for the @href attributes are herein intentionally omitted to emphasize that the values can be provided by the server, and that the client can simply effect the standardized XHTML rules for following links and submitting forms. It is readily appreciated that such non-specificity of the values can provide a certain degree of freedom for the server in view that the server can modify the server's own URL space—with the exception of the entry point—without breaking a compliant client in view that such client can follow an updated URL pattern as the pattern is provided in the hypermedia element(s) returned by the server.

First Example Degree of Freedom: URL Space Freedom.—A hypermedia API can provide a server full control over the server's URL space with the exception, in certain implementations, of any documented entry point URLs.

It should be appreciated that, in one aspect, certain additive changes can be made without breaking pre-existing clients. In particular, additional data can be added to the markup representation, and an old client can disregard such data. In one aspect, additional <input> elements can be added to forms, as long as such elements are optional or provide default values. Old clients coded only to modify form inputs they "understand" can thus be made forward-compatible. This also offers an opportunity for server implementers to provide application state in the form of hidden inputs with default values should they desire.

Second Example Degree of Freedom: Data Additivity Freedom.—In scenarios in which a client is configured (e.g., coded) to ignore elements the client cannot interpret, XHTML-based hypermedia APIs can permit servers to arbitrarily add data to a returned representation.

Third Example Degree of Freedom: Form Additivity Freedom.—In scenarios in which a client is configured (e.g., coded) to submit all form inputs with values, including defaults for inputs the client cannot interpret, and modifying only inputs for which the semantic meaning has been documented, XHTML-based hypermedia APIs can permit servers to "upgrade" existing forms.

In one aspect, if clients rely only on the concept of "containment", for example by using the "//" (descendent) operator from XPath instead of "/" (child), then the server can have the ability to insert additional layers of structural markup without breaking clients.

Fourth Example Degree of Freedom: Hierarchy Freedom.—In scenarios in which clients are configured (e.g., coded) to look for arbitrarily-deeply nested descendants instead of direct children of elements, the server can insert or subtract arbitrary layers of markup from an API representation available at the server.

At this stage, the foregoing example API provides degrees of freedom that do not appear particularly challenging—purely additive changes are often useful, but generally do not permit making certain other, more "destructive" changes. In this specification, the term "destructive" refers to a complex modification to one or more of server functionality or interface configuration at the server side. In the foregoing illustration, clients expect there to be a home page with their wish list, and that the text/description of each item can be found by following the individual "self" links for the items. Yet, this leads to a very "chatty" protocol in a scenario in which all items in the wishlist are to be examined. A pertinent issue is that of how to proceed in a scenario in which a server operator desires to perform an upgrade that can inline the items in the top-level list. As an illustration, FIG. 4 presents an example API having a top-level representation that has the item text placed inline. In such drawings, inline item text is shown in boldface.

In the example, API 400, a <span> has been substituted with the actual item text for the "self" links previously extant in the API. The disclosure addresses how a client may be configured (e.g., coded) in a manner that the client may read data out of the current representation and/or follow item links as needed. For example, in a scenario in which the <li> with @class "wishitem" represents an application domain object, the text of such item can be considered a scalar attribute of the "wishitem" object. In such scenario, the following server degree of freedom is available:

Fifth Example Degree of Freedom: Resource Granularity Freedom.—In scenarios in which clients are configured to find object attributes inline in a given representation or to follow a provided "self" link to an alternative representation, an XHTML-based hypermedia API can provide a server with control over the granularity of resource(s) returned by the server, including fully inline and concrete (e.g., all attributes present), fully shallow (e.g., self link only), or partial (e.g., self link and at least one concrete attribute).

It should be appreciated that in a scenario in which an application domain is regarded as an object graph, by having clients adhere to a certain group of generic, and relatively straightforward, conventions, a server can be afforded complete control over how such object graph gets laid out across URLs and response bodies without having clients get "lost" because the clients can no longer find specific pieces of data. In one aspect, a client that utilizes an evolvable API can "respond" (or "react") to the representation(s) the client receives, rather than depend on or adopt specific assumptions about which data can be located where. It should be appreciated that it is precisely such lack of assumptions that can render the client robust with respect to server-side changes—assumptions cannot be broken if they are not made in the first place.

In order to achieve this flexibility, in one aspect, the server cannot move or remove data without leaving a "signpost" that clients can utilize to find and/or access such data. In certain implementations, the signpost can be embodied or can comprise a self link. Thus, certain types of changes are to be contemplated in order to build a client that can be forward-compatible and to reserve flexibility for later server-side changes.

In the example related to management of a wish list (see FIG. 3), in a scenario in which it is desired to permit a client to remove items from the wish list, a specific @class for a <form> can be defined in order to allow such removal. For instance, a "delete item" class can be defined. In certain implementations, such form can be located inline with each item as illustrated in the example API 500 shown in FIG. 5.

It should be appreciated that, in one aspect, in an application domain object model, inclusion of such class for removal of an item can be viewed as a delete( )method on each wish list item. Accordingly, the methods present in the application domain object model can be located within the specific class instances. In one aspect, it is contemplated that the server can provide itself with a cue in each form to indicate which item is being attempted to be deleted. In one embodiment, such cue can be embodied in or can comprise an identifier in the @action URL. In additional or alternative embodiments, the cue can comprise the value of a hidden input in the form, for example. It should be appreciated that regardless of the specific cue, a client need not be aware of the mechanism for removal of an item—the client simply can identify the item that the client intends to delete, and then can submit an appropriate form.

Figure 6:

In scenarios in which a large collection of objects is available, or many methods per object are available, such approach for removal of items can yield quite verbose representations, as the structure of several very similar <form> elements in the markup is repeated. In one aspect, while compressing the response bodies (e.g., via gzip encoding) can mitigate verbosity, one alternative approach can rely on an instance method being implemented as a simple function that takes a pointer to the instance as an additional argument. Accordingly, in one embodiment, as illustrated in example API 600 in FIG. 6, a form can be provided one time, identifying an additional argument to be utilized for specifying which particular application domain object is being addressed:

In the example API 600, each wish list item is provided with an @id attribute, which can be conceptually regarded as a "pointer" to that particular item. In one implementation, a client can treat this @id as an opaque string that may be provided as the value for the <input> with @name="self" in the form that has been hoisted out of the list. In certain embodiments, such pattern may be similarly generalized to "pass" objects as arguments to a variety of forms.

In a scenario in which all or substantially all of the inputs to a <form> are explicit (for example, when we had inline forms for each item, the items themselves were implicit inputs to those forms), it also can be possible to hoist the form itself all the way up to the representation found in the entry point URL, rather than necessarily appearing in the same response bodies as the objects they act upon. Accordingly, for example, several hypermedia controls can be provided on the API home page, which itself can be marked as highly cacheable. Thus, the disclosure permits designing evolvable APIs that are concise in their response representations.

Sixth Example Degree of Freedom: Form Location Freedom.—In a scenario in which a client is configured to lift identifiers from object representations or to be provided with context-sensitive forms to use, an XHTML hypermedia API can permit a server to locate forms at its convenience.

Figure 7:
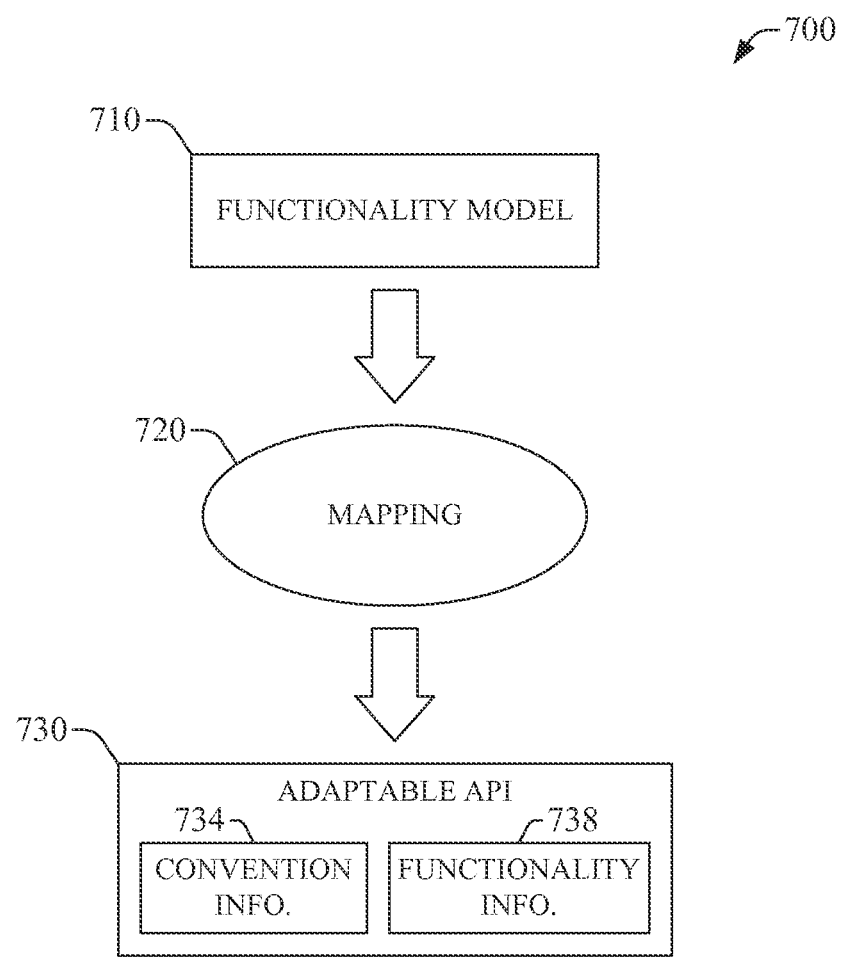
FIG. 7 illustrates an example protocol for composition of an evolvable application programming interface (API) in accordance with one or more aspects of the disclosure.

In one aspect, it has been shown herein how clients can be expected to interact with XHTML hypermedia APIs. In another aspect, it has been shown herein how being prepared for certain possibilities permits a client to be forward-compatible with a variety of server-side changes. The described examples are effective to introduce the disclosed framework for composition of an evolvable API. The concepts introduced by such examples, can be cast into a set of conventions that can be utilized for systematically translating an application domain object model into a hypermedia APIs in accordance with one or more aspects of the disclosure. FIG. 7 illustrates a block diagram of the logic for composition (e.g., definition and/or specification) of an evolvable hypermedia API. As described in greater detail below, a functionality model 710 representative or indicative of specific functionality (e.g., one or more functions of the functionality 150) can be provided to a mapping stage 720 (also referred to as mapping block) in which at least one convention of the set of conventions can be applied to associate an element (e.g., an object) of the functionality model 710 with a hypermedia element utilized to compose an adaptable hypermedia API 730 (also referred to as adaptable API 730 or evolvable API 730). The adaptable API 730 can comprise convention information 734 and functionality information 738. In one aspect, the convention information 734 can comprise data and/or metadata indicative of naming conventions, whereas the functionality information 738 can comprise data and/or metadata indicative of representation of methods associated with the functionality model 710.

As described herein, an application domain object model is contemplated as a formal instrument for describing the functionality provided by an API. Such a formal model can be utilized, in one aspect, as the basis for describing the manner in which to translate such model into a set of protocol requirements, and hence as a set of guidelines for implementing clients (e.g., client 110) and servers (which can be embodied, for example, by the computing device 140). It should be appreciated that it advantageous, yet not necessary to formulate an object-oriented (OO) model to build a web-based API.

One example advantage of utilizing an OO mode to build a web-based API is that a wealth of knowledge in the OO community can be leveraged to design class hierarchies in a maintainable and extensible fashion. For example, the "SOLID" design principles suggest guidelines for designing a domain object model that is unlikely to need to change. Thus, in a scenario in which an application domain object model that adheres to these design principles is implemented, the likelihood that changes to an API in a non-backwards-compatible way, at least from the domain model point of view, are needed is reduced.

In one aspect, the disclosure contemplates that the set of available functionality of an application is documented as a class hierarchy in a functionality model (e.g., an application domain object model). In one aspect, it can be contemplated that a formal UML diagram can be indicative or representative of such class hierarchy. In another aspect, to compose an evolvable hypermedia API, one or more object-oriented constructs associated with the functionality model can be mapped onto an XHTML hypermedia API, for example, in accordance with aspects described herein. Mapping of data elements are described first, followed by representation of methods. In certain embodiments, data types can be limited to string literals and objects having attributes that are themselves either objects or strings. It should be appreciated that the various disclosed principles for mapping an object-oriented construct into an evolvable API are not limited to composition of XHTML hypermedia APIs.

Names.—The concept of a name is introduced and utilized in the disclosure. A name is an opaque string utilized as a signpost and known to both clients and servers. As understood in the art, opaque strings are strings that are contained in a program in execution (or at runtime) without the program examining the strings' content. As one example convention, it can be required that names be unique at least within an application. It should be appreciated that, in one aspect, ensuring that a name is universally unique can prevent collisions between application domains. In one aspect, unique names for classes, members, and/or methods are contemplated.

Figure 8:

To represent a string literal, in one aspect, an XHTML text node can be utilized. In another aspect, to represent an object, any XHTML node that can contain children can be utilized. For a example, a class called "Car" may have been defined with two member variables: make and model. An associated representation 800 is illustrated in FIG. 8.

Empty strings can be represented by <span></span>, and when desired, NULLs can be represented by adding an additional @class value to distinguish such NULLs from empty strings, as in the following example:

<span class="make null"></span>

Figure 9:
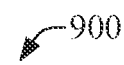

In one aspect, sparse representations that leave out some of the object's fields can be permitted when a link to an alternative representation is included, as illustrated by the boldfaced feature in the example representation 900 illustrated in FIG. 9. In such example representation, a client (e.g., client 110) configured to find the car's model, in response to not finding an element with @class="model", can follow the "car" class's self link and search for the member variable (e.g., the model) in the linked location. In one aspect, it can be contemplated that the representation located at the linked destination (or location) identified by the self link's @href attribute contain exactly one topmost element with "car" in its @class attribute, which it can be understood to represent the same car represented in the API containing the self link. The client can then search for the model field in the linked destination, for example, in certain implementations, by following additional links.

In one aspect, from the perspective of a disclosed evolvable API, static fields of classes are essentially global variables. Accordingly, an example convention can contemplate that such static fields be globally discoverable from the API entry point. Stated equivalently, it is contemplated that the representation at one of the API entry points contains exactly one topmost element with the appropriate @class. For example, in a scenario in which a constant is declared as a static field in a class, it can be required that the following to be on the API "home page":

<span class="pi">3.141592654</span>

In the alternative, in such scenario, the server can be permitted to provide a link to static field on the entry point representation, as illustrated in the following example:

<a_rel="pi" href="..."/>

It can then be expected that the representation at that @href contains an element with the "pi" @class or another link with the "pi" @rel. In view that the @rel attribute of an <a> tag can be multi-valued, a single link can be provided in scenarios in which a specific resource is desired to be used for holding all or substantially all static constants. It should be appreciated that for a server, utilization of a single link can be useful for caching purposes. The following is an illustration of single link utilization:

<a_rel="pi constant1 constant2 field3 field4 "href="..."/>

In one aspect, instance variables which are themselves objects (e.g., the "owner" class in FIG. 10) can be inline, as illustrated in FIG. 10. In another aspect, such instance variables can be linked, as illustrated in FIG. 11.

In certain scenarios, it can be assumed that instance methods can take an arbitrary number of arguments and return zero or one values (as it is common in many object-oriented languages, for example). For each method, it can be desired to assign the method a name, and then it can be expected that there is a <form> with such name in the @class. It also can be expected that there are <input>, <select>, or <textarea> elements in the form in which the arguments can be passed to the method, and these should have @name attributes that correspond to the method parameter names. For example, in the disclosed working example, the "car" class may have an "accelerate" method that can be defined in the following manner:

void accelerateTo(String mph);

Accordingly, an example API can be represented as illustrated in FIG. 12.

In scenarios in which it is desired to pass object instances as arguments, it can be contemplated that the representations for such objects have an @id attribute, and such attribute can be provided as the value for the form input. In one aspect, a convention contemplating that an <input> with @name="self" can be utilized for passing the instance itself can be provided, which can permit hoisting the <form> out of each object's representation, as illustrated in FIG. 13, wherein the <form> is hoisted out of the "car" class. In additional or alternative embodiments, as illustrated boldface in FIG. 14, linking out to the form specifically also can be permitted.

In one aspect, the representation available at the @href for the link can have exactly one topmost <form> with @class="accelerateTo", which can be understood to be the form for making this car accelerate, or such representation can have exactly one topmost <a> tag with @rel="accelerateTo" which is a subsequent link of this type. Thus, in certain implementations, for instance methods, one or more of the following features can apply: (i) the <form> is contained within the representation of the object; (ii) there is a link to the form contained within the object's representation; (iii) there is a <form> in the entry point representation that takes a "self" input; or (iv) the entry point representation has a link to a self-input form. Accordingly, the disclosure provides deep and shallow methods (linked or inline forms, for example) which can be located either contextually (within their object representations) or globally (accepting a "self" argument).

In one aspect, static methods on classes can omit the "self" inputs and are or need to be globally located, residing on the entry point representation or linked to therefrom.

In one aspect, void return values can be simple: a client can use an HTTP response code for the form submission to check for success. In another aspect, a server can instead include a new representation for an object as a return value, which can provide an application flow that can leverage features similar to those of the "literate programming" style.

When returning a value, in one scenario, a response from a server to a form submission from a client can contain the return value in a uniquely distinguishable location in the response representation. In one implementation, by convention, exactly one element can be closest to the document root, the element having a @class="returnValue". In a scenario in which a string literal is returned, such element can be any text-containing XHTML tag, such as a <span> or <p>. In an additional or alternative scenario in which an object is returned, the object can be represented as described herein. In such scenario, a returned object may have multiple classes, as illustrated in the following representation:

<div class="car returnValue">. . . </div>

The various conventions disclosed herein are illustrative and other conventions also are possible. Yet, the disclosed conventions can permit composing an evolvable hypermedia API (also referred to as "evolvable API") that permits evolution (e.g., upgrade) of various aspects of implementation of a server that relies on the API for inter-operability with a client. Such aspects can include one or more of granularity of data representation (via sparse or linked object representations); URL patterns (via the use of hypermedia, for example); location and format of the hypermedia controls themselves; class fields and methods (via addition, for example); or method parameter lists (via the provision of default or optional inputs). Such features form a substantive group of degrees of freedom, and can permit a server (which can be embodied, for example, by the computing device 140) to optimize its resource representations to incorporate one or more of caching, network round trips, etc., while preserving inter-operability with a compliant hypermedia client (e.g., client 110).

It should be appreciated that a server cannot remove or change functionality—such as removing a field from a class, changing the string representation of a scalar value, and/or changing the semantic meaning of a method—without breaking clients that depend on that functionality. Yet, there is simply no possibility of backward compatibility in such scenarios, regardless of whether XHTML-based hypermedia APIs are utilized or not. Instead, the disclosure permits a client to access functionality as long as such functionality remains supported at the server side, even though the access mechanisms may be significantly modified.

It should be noted that the degree of evolution provided by the disclosure can contemplate having clients that are sufficiently adaptable in "reacting" to the set of representations they receive, according to the conventions we have laid out. For example, in the foregoing representation of a "car" above, a client can be configured to search for its "model" attribute inline or by following one or more "self" links to find such attribute. Thus, depending at least on whether a server provides a full, partial, or shallow representation of the "car", the client can react accordingly vis-à-vis whether it makes additional network requests.

In one aspect, the disclosure addresses the issue of mapping client use cases into a flow between application states by introducing certain requirements around one or more interface representations that are utilized. As a result, the disclosure can isolate such issue as a server implementation challenge, by documenting the API around the application semantics—expressed as a documented object model, for example—and providing a set of conventions that ensure a client can work with any compliant resource/representation mapping. In another aspect, the disclosure also can exploit reusability by leveraging object-oriented techniques. For instance, object reusability can permit defining, within an evolvable API, application functionality that is more likely to be easily maintainable and may not require substantive change.

It should be appreciated that, in certain embodiments, support libraries—particularly, yet no exclusively, for clients—can be generated, wherein one such library can be configured to adopt one or more of the disclosed generic conventions, and can provide mechanisms for finding static and instance fields and methods and for invoking methods or following links. For example, FIG. 15 illustrates a representation of one such library.

In one aspect, providing such libraries can permit building client libraries for APIs that can deal primarily with an available domain object model rather than the HTTP and hypermedia details. In dynamically typed languages (such as Python or Ruby) or in languages that can support reflection or runtime code generation (such as Java), an API can be composed to be significantly transparent, wherein classes and instances with the fields and methods made available in the markup of the API can be generated dynamically in nearly realtime (also referred to as "on-the-fly"). In one aspect, provided a set of conventions adopted by a community of developers, a set of compatible open source client libraries can be provided for popular programming languages (e.g., Java, Perl, Python, Ruby, etc.). In another scenario, mobile applications that utilize server-side APIs can exploit various features of the disclosure, as service providers can evolve one or more server implementations without breaking application versions that are in the wild and that may not have been updated by users of such applications.

It also should be appreciated that the disclosed principles of composition, e.g., specification, of APIs are illustrated with conventions based on XHTML primarily because such language has sufficient hypermedia controls for representing pointers and method calls and is easily parsed and manipulated as a subset of XML. Yet, the disclosure is not so limited and such principles can be implemented in other media types (e.g., HTML, Atom, HAL, or the like) for which the conventions for hypermedia and structured data are defined.

It should further be appreciated that utilizing multiple media types in an API can be possible. For example, all or substantially all the <form> elements can be hoisted up to an API entry point represented in XHTML. In addition or in the alternative, forms or URI templates can be utilized to replace links, in which case it can be possible to represent every other resource as an efficient binary message body utilizing formats such as Protocol Buffers, Thrift, or Avro. Such utilization of forms or URI templates can permit implementation of evolvable APIs that can resemble a binary protocol over the wire while maintaining the evolutionary benefits of a hypermedia API in accordance with one or more aspects of the disclosure. Such implementation can be implemented in scenarios in which an entry point representation is cacheable.

Figure 16:
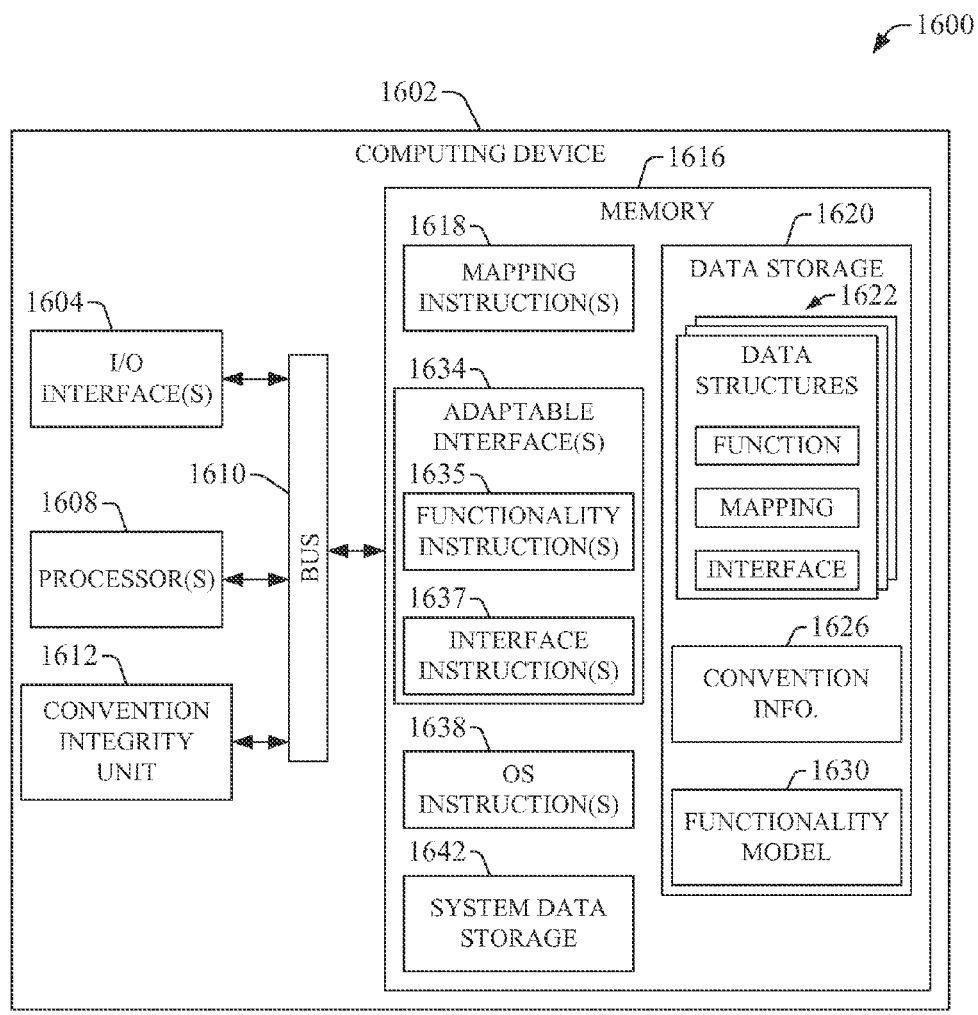
FIG. 16 illustrates an example computing device in accordance with one or more aspects of the disclosure.

FIG. 16 is a block diagram of an exemplary embodiment 1600 of a computing device 1602 in accordance with one or more aspects of the disclosure. The computing device 1602 is an apparatus that can embody or can comprise a server or a client in accordance with one or more aspects of the disclosure. For example, the computing device 1602 can embody a server (which can be embodied by, for example, the computing device 140), or a client (e.g., client 110). In the illustrated embodiment, the computing device 1602 comprises a group of one or more I/O interfaces 1604, a group of one or more processors 1608, a memory 1616, and a bus 1612 that functionally couples (e.g., communicatively couples) two or more of the functional elements of the computing device 1602 including the group of one or more processors 1608 to the memory 1616. In scenarios in which operation of the computing device 1602 can be critical to network performance, such as in security-sensitive applications (e.g., banking services), the group of one or more processors 1608 can comprise a plurality of processors that can exploit concurrent computing.

The functionality of computing device 1602 can be configured by a group of computer-executable instructions (e.g., programming code instructions or programming modules) that can be executed by at least one processor of the one or more processors 1608. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a first group of computer-executable instructions can configure logic that, in response to execution by the at least one processor, can enable the computing device 1602 to operate as a server (an application server, a provisioning server, an AAA server, a proxy server, a communication management server, etc.), a gateway node (a session border controller (SBC), a media gateway control function ((MGCF), etc.). In the alternative, a set of computer-executable instructions can configure the computing device 1602 to operate as a client (e.g., client 110), which can be deployed in the wild.

Data and computer-accessible instructions, e.g., computer-readable instructions and computer-executable instructions, associated with specific functionality of the computing device 1602 can be retained in memory 1616. Such data and instructions can permit implementation, at least in part, of the composition and/or utilization of an evolvable API in accordance with one or more aspects of the disclosure. In one aspect, the computer-accessible instructions can embody any number of programming code instructions or program modules that permit specific functionality. In the subject specification and annexed drawings, memory elements are illustrated as discrete blocks; however, such memory elements and related computer-accessible instructions and data can reside at various times in different storage elements (registers, memory pages, files, databases, memory addresses, etc.; not depicted) in memory 416.

Data storage 1620 can comprise a variety of data, metadata, or both, associated with composition and/or utilization of an evolvable API in accordance with aspects described herein. As illustrated, the data storage can comprise a plurality of data structures 1622 that are specific to composition and/or utilization of an evolvable API. In one aspect, at least one of the plurality of data structures 1622 can comprise or can be embodied in a function data structure. In another aspect, at least one of the plurality of data structures 1622 can comprise or can be embodied in an interface data structure. In yet another aspect, at least one of the data structures 1622 can comprise or can be embodied in a mapping data structure.

The one or more computer-accessible instruction(s) contained in the memory 1616 for implementation of specific functionality of the computing device 1602 in connection with composition of an evolvable hypermedia API described herein can be retained as one or more memory elements within the memory 1616. As illustrated, a memory element 1618, labeled as mapping instruction(s), and a memory element 1634, labeled as evolvable interface(s), can contain a plurality of computer-accessible instructions for implementation of such functionality. In one aspect, as described herein, the mapping instruction(s) 1618 and/or the adaptable interface(s) 1634 can be stored as an implementation (e.g., a compiled instance) of one or more computer-executable instructions that implement and thus provide at least the functionality of the methods described herein. The mapping instruction(s) 1618 and/or the adaptable interface(s) 1634 also can be transmitted across some form of computer readable media. It should be appreciated that, in one aspect, different functionality instruction(s) can render physically alike computing devices into functionally different components (e.g., a server and a client), with functional differences dictated by logic (e.g., computer-executable instructions and data) specific to each one of such computing devices and defined by the specifics of the mapping instruction(s) 1618 and/or the adaptable interface(s) 1634. For instance, in one implementation in which the computing device 1602 embodies a client (e.g., client 110), the mapping instruction(s) 1618 may be removed from the memory 1616.

As described herein, execution of the mapping structure(s) 1618 can implement composition of an evolvable hypermedia API at the computing device 1602 in accordance with aspects described herein. Execution of at least a portion of the mapping instruction(s) 1618 can utilize information retained in a functionality model 1630 to generate an evolvable API. In one aspect, such generation can comprise generation of a computer-accessible instruction in a hypermedia language, wherein the instruction can be retained in the memory element 1634. Similarly, execution of at least a portion of the mapping instruction(s) 1618 can utilize information retained in convention information 1626.

As illustrated, the adaptable interface(s) 1634 can comprise one or more functionality instructions 1635, which can be indicative, for example, of one or more methods associated with the functionality that is to be accessed via an evolvable hypermedia API. The adaptable interface(s) 1634 also can comprise one or more interface instructions 1637 which can be indicative of the formal structure, e.g., a tree structure, an inline method, a linked instance method, or the like, of an evolvable hypermedia API. As described herein, execution of the adaptable interface(s) 1634 can implement an evolvable hypermedia API at the computing device 1602. Execution of at least a portion of the adaptable instruction(s) 1634 can utilize one or more data structures in the memory element 1622.

Memory 1616 can be embodied in a variety of computer-readable media. Exemplary computer-readable media can be any available media that is accessible by a processor in a computing device, such as one processor of the group of one or more processors 1608, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto. It should be appreciated that in a scenario in which the computing device 1602 embodies a server, the memory 1616 can be configured differently than in a scenario in which the computing device 1602 embodies a client.

Memory 1616 can comprise computer-readable non-transitory storage media in the form of volatile memory, such as random access memory (RAM), electrically erasable programmable read-only memory (EEPROM), and the like, or non-volatile memory such as read only memory (ROM). In one aspect, the memory 1616 can be partitioned into a system memory (not shown) that can contain data and/or programming modules that enable essential operation and control of the computing device 1602. Such program modules can be implemented (e.g., compiled and stored) in memory element 1638, referred to as operating system (OS) instruction(s) 1638, whereas such data can be system data that is retained in memory element 1642, referred to as system data storage 1642. The OS instruction(s) 1638 and system data storage 1642 can be immediately accessible to and/or are presently operated on by at least one processor of the group of one or more processors 1608. The OS instruction(s) 1638 can embody an operating system for the computing device 1602. Specific implementation of such OS can depend in part on architectural complexity of the computing device 1602. Higher complexity affords higher-level OSs. Example operating systems can include Unix, Linux, iOS, Windows operating system, and substantially any operating system for a computing device. In certain scenarios, the operating system embodied in OS instruction(s) 1638 can have different levels of complexity based on particular configuration of the computing device 1602. For example, an operating system for a server (e.g., which can be embodied by, for example, the computing device 140) can be more complex than an operating system for a client (e.g., client 110).

Memory 1616 can comprise other removable/non-removable, volatile/non-volatile computer-readable non-transitory storage media. As an example, the memory 1616 can include a mass storage unit (not shown) which can provide non-volatile storage of computer code, computer readable instructions, data structures, program modules, and other data for the computing device 1602. A specific implementation of such mass storage unit (not shown) can depend on desired form factor of the computing device 1602 and space available for deployment thereof. For instance, in a scenario in which the computing device 1602 embodies a mobile device, the mass storage unit can be substantially smaller than in scenarios in which the computing device 1602 is a desktop workstation. For suitable form factors and sizes of the computing device 1602, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

As illustrated, the computing device 1602 can comprise a convention integrity unit 1612 which can determine that an implementation of an adaptable interface (e.g., an evolvable interface) of the adaptable interface(s) 1634 is specified in accordance with one or more of the conventions described herein. For example, in certain implementations, the convention integrity unit 1612 can perform (e.g., execute) an automated test that permits to check that object representations satisfy one or more of the contemplated criteria (or conventions) described herein, and that static fields and methods can be discoverable from an entry point. As described herein, integrity of the object representations can provide a substantive degree of safe evolution with respect to transmitting-device-receiving-device inter-operability. In one embodiment, the convention integrity unit 1612 can operate in a development stage (e.g., coding) of the evolvable interface, and not at runtime. In another embodiment, the convention integrity unit 1612 can operate during runtime to establish dynamically (e.g., in nearly realtime) the integrity of the adaptable interface. In one implementation, the convention integrity unit 1612 can be a firmware component that can have dedicated resources (e.g., a processor, software, etc.) to implement certain functions that support implementation of or implement the integrity checks described herein. In another embodiment, the convention integrity unit 1612 can include at least a portion of the one or more processors 1608 which can be dedicated to execution of a part or all of the mapping instruction(s) 1618 and/or the adaptable interface(s) 1634, thus relieving at least some of the computational load from the one or more processors 1608 for other operation of the computing device 1602.

Features of composition of an adaptable hypermedia API (e.g., an evolvable hypermedia API) in accordance with aspects described herein can be performed, at least in part, in response to execution of software components by a processor. The software components can include one or more implementations (e.g., encoding, compilation, etc.) of mapping instruction(s) 1618 and/or adaptable interface(s) 1634. In particular, yet not exclusively, to provide the specific functionality of the computing device 1602, a processor of the one or more processors 1608 can execute at least a portion of the computer-accessible instructions in the mapping instruction(s) 1618 and/or the computer-accessible instructions in the adaptable interface(s) 1634.

In one embodiment, for example, the computing device 1602 can comprise a processor of the one or more processors 1608 than can be programmed, by computer-executable instructions associated with the adaptable interface(s) 1634, to dismiss elements in a data representation in response to a method call referenced in an evolvable hypermedia application programming interface (API), the evolvable hypermedia API being a tree-structured extensible media type with at least one hypermedia affordance, and to submit a form input with at least one default value for non-documented semantics in the evolvable hypermedia API. In one aspect, the processor can be further configured, by the computer-executable instructions, to modify a form input having a documented semantics in the hypermedia API. In another aspect, the processor can be further configured, by the computer-executable instructions, to access a nested descendent of an object beyond a direct child of the object. In yet another aspect, the processor can be further configured, by the computer-executable instructions, to access an object attribute by following a hypermedia link to an object representation in the evolvable hypermedia API. In still another aspect, the processor being further configured, by the computer-executable instructions, to access an object identifier from an object representation in the evolvable hypermedia API.

In one embodiment, for example, the computing device 1602 can comprise a processor of the one or more processors 1608 that can be programmed, by computer-executable instructions associated with the adaptable interface(s) 1634 and/or the mapping instruction(s) 1618, to update at least one uniform resource identifier referenced in an evolvable hypermedia application programming interface (API). In one aspect, the evolvable hypermedia API comprises a tree-structured extensible media type with at least one hypermedia affordance. In another aspect, the evolvable hypermedia API further comprises one or more of an extensible hypertext markup language (XHTML)-based RESTful API, an Atom RESTful API, or a hypertext application language (HAL)-based RESTful API. In another aspect, the evolvable hypermedia API comprises a tree structured extensible media type, and wherein the evolvable hypermedia API comprises one or more of extended markup language (XML)-based API or a JavaScript Object Notation (JSON)-based API. In certain implementations, the processor can be further programmed, by the computer-executable instructions, to provide a resource according to at least one of an inline and concrete format, a link-based format, or a combination of a link-based format and a concrete format, wherein the concrete format comprises at least one attribute and the link-based format comprises at least one hypermedia link.

In general, a processor of the group of one or more processors 1608 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 1608 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 1608 can be implemented as a combination of computing processing units.

The one or more input/output (I/O) interfaces 1604 can functionally couple (e.g., communicatively couple) the computing device 1602 to another functional element (component, unit, server, gateway node, repository, etc.) of a network, such as network 130, for example. Functionality of the computing device 1602 that is associated with data I/O or signaling I/O can be accomplished in response to execution, by a processor of the group of one or more processors 1608, of at least one I/O interface that can be retained in memory element 1638. Such memory element is represented by the block OS instruction (s) 1638. In some embodiments, the at least one I/O interface can embody an API that permits exchange of data or signaling, or both, via an I/O interface of I/O interface(s) 1604. In certain embodiments, the one or more I/O interfaces 1604 can include at least one port that can permit connection of the computing device 1602 to other functional elements of the network 130. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 1604 can enable delivery of output (e.g., output data, output metadata, output signaling) to such functional elements. Such output can represent an outcome or a specific action of one or more actions described herein, such as in the example method shown in FIG. 4.

Bus 1610 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

Figure 17:
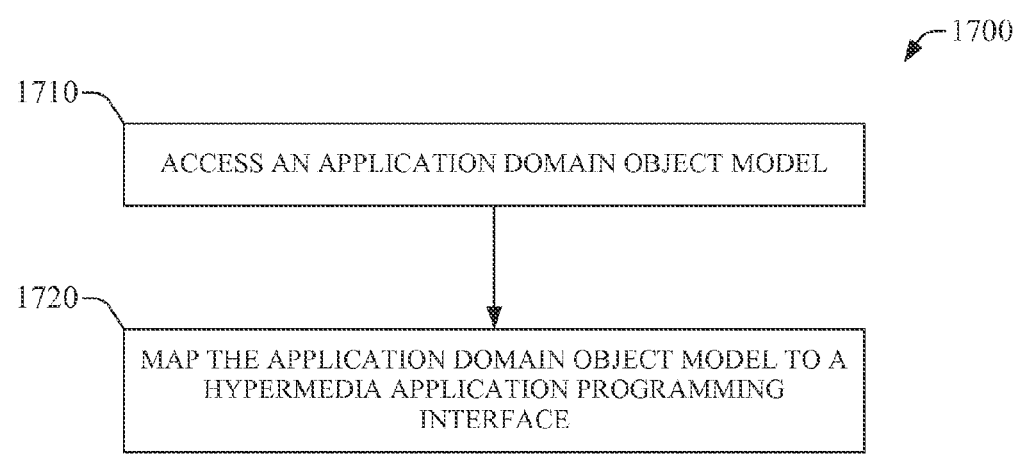
FIG. 17 illustrates an example method in accordance with one or more aspects of the disclosure.

In view of the various aspects of composition of evolvable APIs, such as those described herein, exemplary methods that can be implemented in accordance with the disclosure can be better appreciated with reference to the exemplary flowchart in FIG. 17. For simplicity of explanation, the exemplary methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The methods disclosed throughout the subject specification and annexed drawings can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 17 is a flowchart of exemplary method 1700 for providing an evolvable hypermedia API in accordance with one or more aspects of the disclosure. The subject example method 1700 can be implemented (e.g., executed) by a client device (e.g., client 110) or a computing device, such as a server, or a processor integrated into or functionally coupled to the client device or the server. In one implementation the computing device 1602, via at least one of the processor(s) 1608 can implement (e.g., execute) the example method 1700. In At block 1710, an application domain object model is accessed. Implementation of block 1710 can be referred to as an accessing action and, in one aspect, can comprise accessing data indicative of a class hierarchy representative of specific functionality associated with the application domain object model.

At block 1720, the application domain object model can be mapped to a hypermedia API according to at least one of a plurality of generic conventions for method representations and data representations. Implementation of block 1720 can be referred to as a mapping action. In one implementation, the mapping action can comprise creating, according to the at least one of the plurality of generic conventions, a tree-structure extensible API. In another implementation, the mapping action can comprise creating, according to the at least one of the plurality of generic conventions, a tree-structure extensible API having at least one media affordance. In yet another implementation, the mapping action can comprise representing a string literal in the application domain object model with a hypermedia text node.

In certain embodiments, the mapping action comprises representing an object with a markup node configured to contain one or more descendent nodes. In one aspect, the mapping action can further comprise representing an instance method of the object with a method name and a form associated with the method name, the form being a descendent node of the markup node and having one or more hypermedia input elements for passing one or more arguments to the instance method, each of the one or more hypermedia input elements corresponding to at least one parameter name of the instance method. The representing action can be implemented in various manners. For example, the representing action can comprise providing an inline element indicative of a field of the object, the inline element being a descendent node of the markup node. For another example, the representing action can comprises providing a hypermedia link representative of a field of the object, the hypermedia link being a descendent node of the markup node. In one scenario, when the field of the object is a static field, the providing action comprises providing the hypermedia link within an object's representation present at an entry point of the hypermedia API. In another scenario, when the field of the object is a static field, the providing action comprises providing an inline element indicative of the static field within an object's representation present at an entry point of the hypermedia API, the inline element being uniquely identifiable.

In another aspect, the mapping action can further comprise representing an instance method of the object with a method name and a link to a form associated with the method name, the link being a descendent node of the markup node, and the form being uniquely identifiable and having one or more hypermedia input elements for passing one or more arguments to the instance method, each of the one or more hypermedia input elements corresponding to at least one parameter name of the instance method. In another aspect, the mapping action can further comprise representing an instance method of the object with a method name and a link to a form associated with the method name, the form being part of an object's representation present at an entry point of the hypermedia API and having (i) a hypermedia input element identifying the object and (ii) one or more hypermedia input elements for passing one or more arguments to the instance method, each of the one or more hypermedia input elements corresponding to at least one parameter name of the instance method. In another aspect, the mapping action further comprises representing an instance method of the object with a method name and a link to a form associated with the method name, the form being linked from an object's representation present at an entry point of the hypermedia API, the form having a hypermedia input element identifying the object, and one or more hypermedia input elements for passing one or more arguments to the instance method, each of the one or more hypermedia input elements corresponding to at least one parameter name of the instance method. In yet another aspect, the mapping action can further comprise representing a static method of the object with a method name and a form associated with the method name, the form being part of an object's representation present at an entry point of the hypermedia API and having one or more hypermedia elements for passing one or more arguments to the instance method, each of the one or more hypermedia elements corresponding to at least one parameter name of the instance method. In still another aspect, the mapping action further comprises representing a static method of the object with a method name and a link to a form associated with the method name, the form being uniquely identifiable and linked from an object's representation present at an entry point of the hypermedia API, the form having one or more hypermedia input elements for passing one or more arguments to the instance method, each of the one or more hypermedia input elements corresponding to at least one parameter name of the instance method.

As it is readily apparent from the subject specific and annexed drawings, the disclosure provides, in one aspect, a hypermedia API and a plurality of conventions for implementing such an API in an XHTML client-server environment, for example. The disclosed techniques (e.g., systems, devices, methods, combinations thereof) can reduce the assumptions (e.g., operational configurations) that a client adopts about a specific implementation of an API. In certain scenarios, the disclosure can permit to understanding the semantics of functionality supported by an associated server. In one aspect, the mechanics for a client's method calls and data lookups can be encoded in a set of one or more generic conventions utilized for interpreting a response returned by a server associated with the client. Accordingly, the disclosure can permit the server to update one or more functional features of the server's implementation without breaking the client.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   accessing, by a computing device, an application domain object model;
   mapping, at the computing device, the application domain object model to a hypermedia application programming interface (API) according to at least one of a plurality of conventions for data representations and method representations; and
   providing the hypermedia API to a client device, wherein the plurality of conventions are configured to allow the client device to be compatible with a change to at least one of the data representations and the method representations by the computing device without a corresponding change to the client device, wherein the change to at least one of the data representations and the method representations comprises at least one of a change of data provided by the hypermedia API to a link to the data and a change of the link to data provided by the hypermedia API to the data.

2. The method of claim 1, wherein accessing, by the computing device, the application domain object model comprises accessing data indicative of a class hierarchy representative of specific functionality associated with the application domain object model.

3. The method of claim 1, wherein mapping, at the computing device, the application domain object model to the hypermedia API comprises creating, according to the at least one of the plurality of conventions, a tree-structure extensible API.

4. The method of claim 1, wherein mapping, at the computing device, the application domain object model to the hypermedia API comprises creating, according to the at least one of the plurality of conventions, a tree-structure extensible API having at least one media affordance.

5. The method of claim 1, wherein mapping, at the computing device, the application domain object model to the hypermedia API comprises representing a string literal in the application domain object model with a hypermedia text node.

6. The method of claim 1, wherein mapping, at the computing device, the application domain object model to the hypermedia API comprises representing an object with a markup node configured to contain one or more descendent nodes.

7. The method of claim 6, wherein mapping, at the computing device, the application domain object model to the hypermedia API further comprises representing an instance method of the object with a method name and a form associated with the method name, the form being a descendent node of the markup node and having one or more hypermedia input elements for passing one or more arguments to the instance method, each of the one or more hypermedia input elements corresponding to at least one parameter name of the instance method.

8. The method of claim 6, wherein mapping, at the computing device, the application domain object model to the hypermedia API further comprises representing an instance method of the object with a method name and a link to a form associated with the method name, the link being a descendent node of the markup node, and the form being uniquely identifiable and having one or more hypermedia input elements for passing one or more arguments to the instance method, each of the one or more hypermedia input elements corresponding to at least one parameter name of the instance method.

9. The method of claim 6, wherein mapping, at the computing device, the application domain object model to the hypermedia API further comprises representing an instance method of the object with a method name and a link to a form associated with the method name, the form being part of an object's representation present at an entry point of the hypermedia API and having (i) a hypermedia input element identifying the object and (ii) one or more hypermedia input elements for passing one or more arguments to the instance method, each of the one or more hypermedia input elements corresponding to at least one parameter name of the instance method.

10. The method of claim 6, wherein mapping, at the computing device, the application domain object model to the hypermedia API further comprises representing an instance method of the object with a method name and a link to a form associated with the method name, the form being linked from an object's representation present at an entry point of the hypermedia API, the form having a hypermedia input element identifying the object, and one or more hypermedia input elements for passing one or more arguments to the instance method, each of the one or more hypermedia input elements corresponding to at least one parameter name of the instance method.

11. A device, comprising:
a memory comprising computer-executable instructions encoded thereon; and
a processor functionally coupled to the memory and programmed, by the computer-executable instructions,
to provide an evolvable hypermedia application programming interface (API) to a device, wherein the evolvable hypermedia API is based on a plurality of conventions configured to allow the device to be compatible with a change to at least one of data representations of the evolvable hypermedia API and method representations of the evolvable hypermedia API without a corresponding change to the device, and wherein the change to at least one of the data representations and the method representations comprises a change in a hierarchal position of a control of the evolvable hypermedia API, and
to update at least one uniform resource identifier referenced in the evolvable hypermedia API.

12. The device of claim 11, wherein the evolvable hypermedia API comprises a tree-structured extensible media type with at least one hypermedia affordance.

13. The device of claim 11, wherein the evolvable hypermedia API further comprises one or more of an extensible hypertext markup language (XHTML)-based RESTful API, an Atom RESTful API, or a hypertext application language (HAL)-based RESTful API.

14. The device of claim 11, wherein the evolvable hypermedia API comprises a tree structured extensible media type, and wherein the evolvable hypermedia API comprises one or more of extended markup language (XML)-based API or a JavaScript Object Notation (JSON)-based API.

15. The device of claim 11, wherein the processor is further programmed by the computer-executable instructions to provide a resource according to at least one of an inline and concrete format, a link-based format, or a combination of a link-based format and a concrete format, wherein the concrete format comprises at least one attribute and the link-based format comprises at least one hypermedia link.

16. A device, comprising:
a memory comprising computer-executable instructions encoded thereon; and
a processor functionally coupled to the memory and programmed, by the computer-executable instructions,
to dismiss elements in a data representation in response to a method call referenced in an evolvable hypermedia application programming interface (API), the evolvable hypermedia API being a tree-structured extensible media type with at least one hypermedia affordance, and
to submit a form input with at least one default value for non-documented semantics in the evolvable hypermedia API.

17. The device of claim 16, the processor being further configured, by the computer-executable instructions, to modify a form input having a documented semantics in the hypermedia API.

18. The device of claim 16, the processor being further configured, by the computer-executable instructions, to access a nested descendent of an object beyond a direct child of the object.

19. The device of claim 16, the processor being further configured, by the computer-executable instructions, to access an object attribute by following a hypermedia link to an object representation in the evolvable hypermedia API.

20. The device of claim 16, the processor being further configured, by the computer-executable instructions, to access an object identifier from an object representation in the evolvable hypermedia API.

* * * * *